(12) United States Patent
Schoeppe

(10) Patent No.: US 6,377,344 B2
(45) Date of Patent: Apr. 23, 2002

(54) ADJUSTABLE COUPLING IN AND/OR DETECTION OF ONE OR MORE WAVELENGTHS IN A MICROSCOPE

(75) Inventor: Guenter Schoeppe, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 09/295,554

(22) Filed: Apr. 21, 1999

(30) Foreign Application Priority Data

Aug. 4, 1998 (DE) .......................................... 198 35 069
Sep. 16, 1998 (DE) .......................................... 198 42 288

(51) Int. Cl.⁷ .............................. G01J 3/30; G01J 3/42; G02B 5/04
(52) U.S. Cl. ...................... 356/318; 356/324; 356/326; 359/615; 359/385
(58) Field of Search .................... 356/318, 324, 356/326; 359/615, 385; 372/100, 102

(56) References Cited

U.S. PATENT DOCUMENTS

| | | | | |
|---|---|---|---|---|
| 3,586,442 A | * | 6/1971 | Tripp | 356/326 |
| 3,865,490 A | * | 2/1975 | Grossman | 356/326 |
| 3,907,430 A | * | 9/1975 | Mann | 356/326 |
| 4,235,518 A | * | 11/1980 | Greiner | 356/326 |
| 4,519,707 A | * | 5/1985 | Kuffer | 356/326 |
| 4,790,654 A | * | 12/1988 | Clarke | 356/326 |

* cited by examiner

*Primary Examiner*—F. L. Evans
*Assistant Examiner*—Zandra V. Smith
(74) *Attorney, Agent, or Firm*—Reed Smith LLP

(57) ABSTRACT

A device for the adjustable coupling of wavelengths or wavelength regions into the illumination beam path of a microscope, preferably in the beam path of a confocal microscope, comprising at least one dispersive element for wavelength separation of the illumination light and at least one at least partially reflecting element arranged in the wavelength-separated portion of the illumination light for reflecting back a wavelength region in the direction of the microscope illumination, and a device for the adjustable detection of object light coming from an illuminated object, preferably in a microscope beam path, comprising at least one dispersive element for wavelength separation of the object light and means arranged in the wavelength-separated portion of the object light for the adjustable stopping down or cutting out of at least one wavelength region and deflection in the direction of at least one detector.

32 Claims, 4 Drawing Sheets

ADJUSTABLE COUPLING IN AND/OR DETECTION OF ONE OR MORE WAVELENGTHS IN A MICROSCOPE

BACKGROUND OF THE INVENTION a) Field of the Invention

The present invention is directed to an adjustable coupling in and/or the detection of one or more wavelengths in a microscope. In particular, the invention is directed to such coupling and detection in the beam path of a confocal microscope.

b) Description of the Related Art

WO Patent 95/07447 (DE 4330347C2) describes a device which is arranged in the detection space of a laser scanning microscope. A main beam splitter, as it is called, (reference number 8 in FIG. 2) must be used in this arrangement.

When a plurality of lasers are used, this same main beam splitter is a very complicated optical layer system that reflects the laser light with only limited selectivity and effectiveness and, because of the non-optional level of edge steepness and reflectivity, the light emitted by the fluorochromes is reflected only with (high) losses.

In general, main beam splitters are those components of a laser scanning microscope which most limit the efficiency and selectivity.

U.S. Pat. No. 4,519,707 describes a multi-spectral detection system with dispersion and separate detection.

JP 493915 describes a spectroscopic system for remote sensing with a plurality of detector elements for wavelength-selective detection of the sensed object.

JP 61007426 describes a photometer with a fluorescence measurement filter in the dispersive light of the object.

DE 19510102 C1 describes a confocal fluorescence microscope for evaluation of fluorescent light with two prism spectrometers in the excitation light path, wherein the first prism spectrometer fans out the excitation light exiting by means of a first stripe diaphragm and the second prism spectrometer fans out the fluorescent light exiting from a second stripe diaphragm and a third prism spectrometer is provided in front of a detector.

Many locations on the object are illuminated and examined simultaneously. In so doing, the entire object plane is illuminated in parallel monochromatically. The achievable confocal effect and contrast depends in these arrangements on the coverage of the illuminated planes with transparent locations. In order to be able to make effective use of these arrangements, there must be a minimum coverage that limits the achievable contrast to 1:100 . . . 1:25. The use of slits leads to a textured confocal effect. This arrangement has disadvantages in terms of application, especially for multiple fluorescence.

The arrangement with three spectrometers which are connected one behind the other and with the use of selection elements in the form of gratings requires an enormous expenditure on adjustment and high stability of adjustment. The use of three duplicate prism spectrometers requires very close manufacturing tolerances. The use of slits for field illumination and the guiding of fluorescent light through the intermediate spaces either results in a considerable portion of the fluorescent light being lost when there is a high degree of coverage in that there is only a low permissible dispersion of the spectrometers or results in a low light yield or light efficiency in illumination at higher dispersions because the slits must be at a distance from one another corresponding at least to the spacing of the spectral width. Multiple fluorescences can be analyzed simultaneously in this arrangement only through increased expenditure.

OBJECT AND SUMMARY OF THE INVENTION

It is the primary object of the invention to replace the conventional complicated main beam splitter with simpler components while at the same time improving flexibility, selectivity and efficiency, wherein the selected arrangement should also be suitable for spectral separation of fluorescent light returning from the object in a serially operating confocal laser scanning microscope with the highest requirements with respect to contrast and efficiency.

This is achieved in that the laser light which advantageously, but not compulsorily, emerges from the end of a fiber is sent through a spectrograph and a special band selector is arranged in the image plane thereof, that is, a comb with narrow fully-reflecting mirrors for fluorescence applications or with partially reflecting mirror stripes for reflection applications. The little mirrors are positioned at selected locations of the wavelengths of the laser or lasers and reflect the light of the desired wavelengths back into the spectrographs so as to be offset by a small angle. In so doing, all illuminating light advantageously returns to an individual point lying very close to a fiber for coupling in the laser light, the pinhole of the laser scanning microscope being located at this point.

Light which returns from the object with the wavelengths of the illumination impinges on the little mirrors of the band selector and, in the case of fluorescence, is fully reflected in the direction of the fiber and therefore effectively separated from the light to be detected; in the case of reflection, it passes partially through the partially reflecting little mirrors as in reflected-light microscopes and can be detected. This will be discussed more closely later on.

In the case of fluorescence, the returning light has wavelengths different than those of the illuminating light and therefore impinges in the image plane of the spectrograph in the neighborhood of the little mirrors.

Even wavelengths located next to the exciting wavelengths around the resolution of the spectrographs can be detected by the invention. These wavelengths are located much closer to the exciting wavelengths than would be possible in the case of dichroic splitters and losses are lower than with splitter layers because of the possible higher transmission. In this case, a plurality of regions of any width and spectral position can be cut out of the spectrum and supplied to different receivers by means of suitably shaped glass wedges such as those used in optical testing with spectrographs for demonstrating subtractive and additive color mixing.

A mirror unit comprises a transparent glass plate with small parallel mirrors at the locations of the anticipated laser wavelengths or at the locations of those laser wavelengths desired for examination, these laser wavelengths enter together, are dispersed, reflected at another location in the prism by the mirrors and imaged on the pinhole.

The mirrors can also be partially reflecting in order to enable detection (passage) of the illumination wavelength (reflection applications).

In fluorescence applications, the mirrors are fully reflecting in order to prevent the detection being influenced by the illumination wavelengths.

The specimen light (fluorescent light) is spectrally separated by at least one dispersive element, parallelized by a field lens and imaged through small glass wedges at different locations via a collector.

Without the wedges which cause a separation of the locations of impingement behind the collector, all of the beams would land in the focal point of the collector.

The spectral width (channel width) is changed by means of vertical wedge displacement, the spectral region of concern (channel position) is selected by horizontal wedge displacement.

Since the wedge angle is constant, there is no change in the deflection in the direction of the receiver.

The wedge angle determines the location of impingement and can be changed by exchanging wedges.

Further, prismatic lenses formed, for example, by lenses glued to wedges or decentered lenses formed by decentered lenses could be used. In this case, the detectors would have to be displaced along with the respective wedges when these lenses are displaced.

In one aspect of the present invention, a device for the adjustable detection of object light coming from an illuminated object, in a confocal microscope beam path, comprises:
  at least one dispersive element for wavelength separation of the object light; and
  means arranged in the wavelength-separated portion of the object light for the adjustable stopping down or cutting out of at least one wavelength region and deflection in the direction of at least one detector.

In another aspect of the present invention, a combination comprises:
  a device comprising at least one dispersive element for wavelength separation of the illumination light; and at least one at least partially reflecting element arranged in the wavelength-separated portion of the illumination light for reflecting back at least one wavelength region in the direction of the microscope illumination;
with at least one of
a device comprising:
  at least one dispersive element for wavelength separation of the object light; and means arranged in the wavelength-separated portion of the object light for the adjustable stopping down or cutting out at least one wavelength region and deflection in the direction of at least one detector;
and a device comprising:
  at least one dispersive element for wavelength separation of the object light; and at least one prism-shaped wedge which is arranged in the wavelength-separated portion of the object light, is made of light-transparent and light-refracting material and whose position is adjustable vertical to the light direction in at least one direction;
wherein said combination is in a microscope.

In one embodiment, at least one dispersive element is used as a common element for coupling in the illumination light and for detecting the object light. In another embodiment, different dispersive elements are used for coupling in the illumination light and for detecting the object light.

The invention is described more fully hereinafter with reference to the schematic illustrations.

DESCRIPTION OF THE PREFERRED EMBODIMENTS

Figure 1:
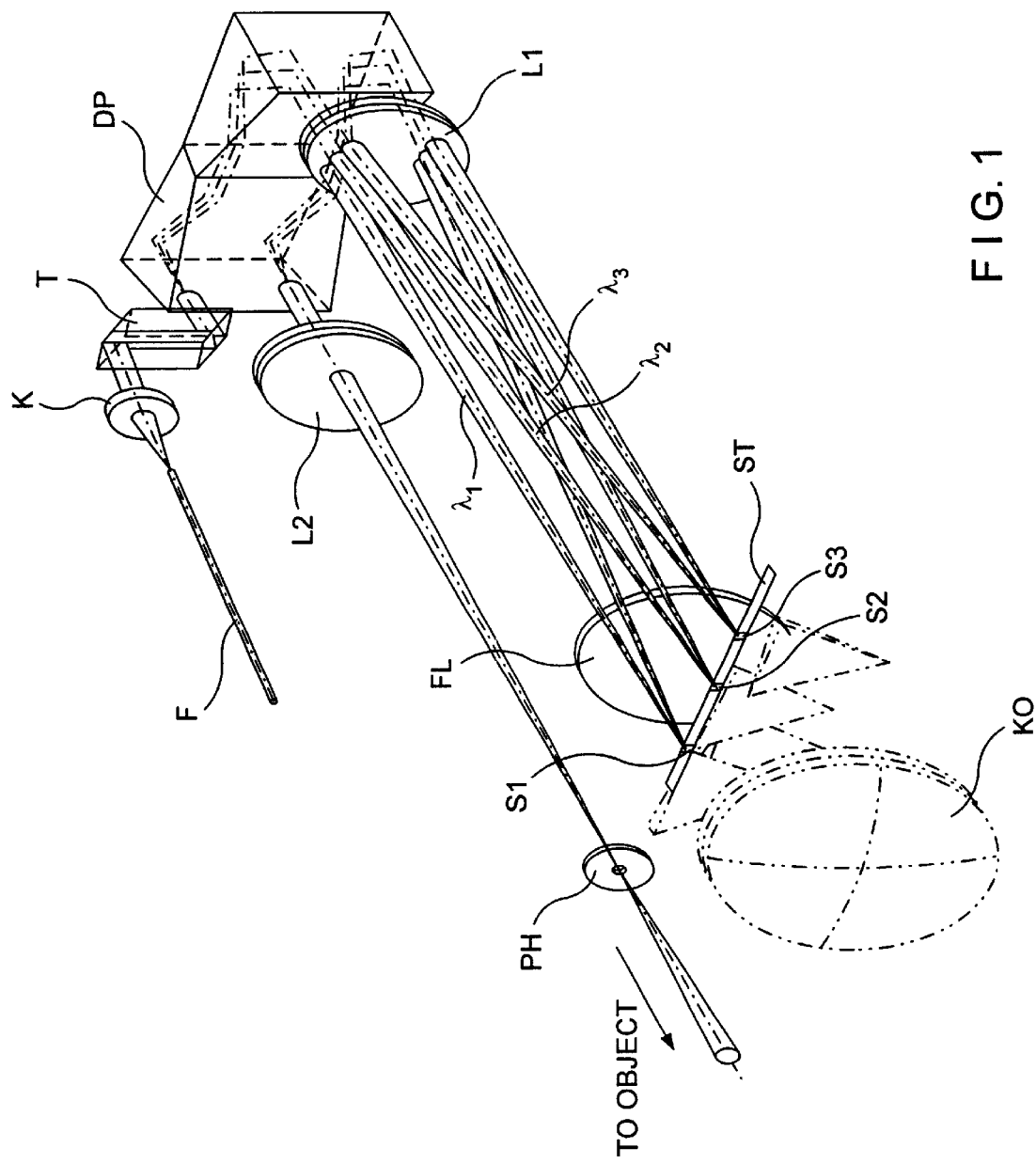
FIG. 1 shows the principle, according to the invention, for coupling in illumination.

In FIG. 1, the light exiting from the fiber F is directed in parallel through the collector K and impinges on a dispersive element DP, wherein a light staircase T is arranged in front of the latter for guiding in the beam. When there is more than one illumination fiber F, a beam combiner (not shown) can also be provided.

The dispersive element DP, in this case a two-part Abbe spectrometer prism, divides the illumination light into the individual colors contained in the laser light, and the divided light which is represented in the present case by 3 wavelengths $\lambda 1$, $\lambda 2$, $\lambda 3$ reaches an element ST, a mirror carrier, which has small mirrors S1, S2, S3 precisely at those locations toward which the light of selected wavelengths is focused, but is otherwise transparent, for example, a glass rod carrying the mirrors; that is, there is always a small mirror arranged where a wavelength of the laser light would be focused.

The individual partial beams enter the upper part of the lens L1 due to the fact that the illumination beam is introduced through the spectrometer prism DP in the upper part so as to be decentered and the individual partial beams are focused on the little mirrors S1, 2, 3 so as to be inclined very slightly diagonally downward, are reflected further downward by the reflection, and return again through the lens L1 in the lower part of the element DP.

The beam also passes through the field lens FL, whose focal length corresponds in a good approximation to the spacing of apparent intersections of all wavelengths in the space between the field lens FL and prism DP, that is, the distance of an apparent source point, i.e., all of the beams apparently come from virtually one point and the focal plane of the lens must lie in this point, so that the beams are all parallelized in the light direction.

Figure 3:
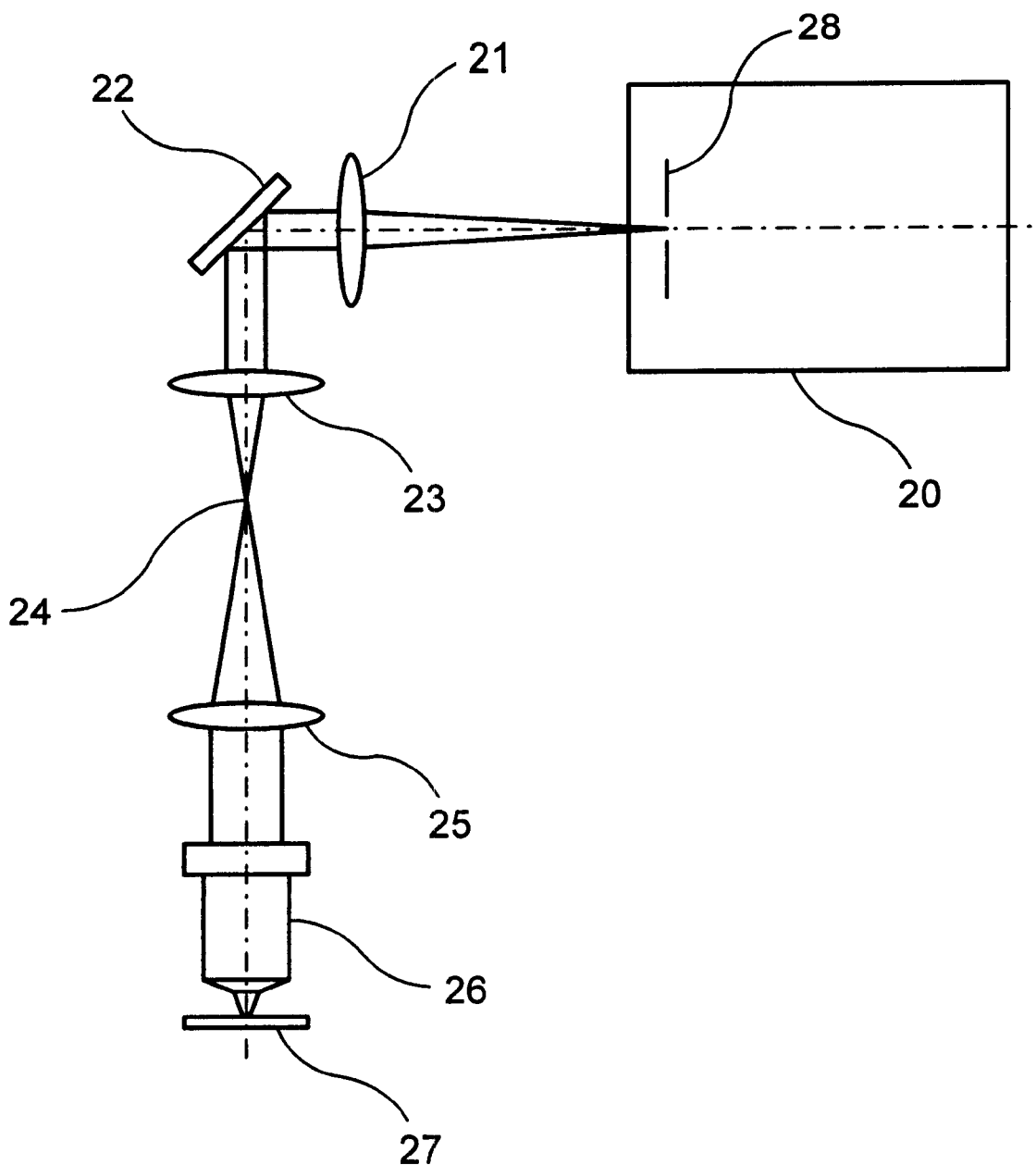
FIG. 3 shows the beam formation of the connected microscope.

On the return path of the light beams from the mirrors S1, S2, S3, the dispersion is canceled again by passing through the dispersive element DP and the light passes as a beam with a plurality of wavelengths through a lens L2 and is collimated on a pinhole PH which can be located, in a known manner, in the intermediate image plane of a laser scanning microscope and enters the microscope, i.e., via the microscope objective, to reach the object as is shown schematically in FIG. 3.

The described excitation line selector (mirror carrier ST with small mirrors S1, S2, S3 . . . ) can be exchangeable, so that any wavelengths, either one or more than one, can be combined.

The light coming from the object can be reflected light or fluorescent light.

For reflected light, the little mirrors S1, S2. . . . must be semi-reflecting so that the returning light travels into the detecting beam path. This arrangement and manner of operation corresponds in principle to that in a normal reflected-light microscope.

Figure 2:
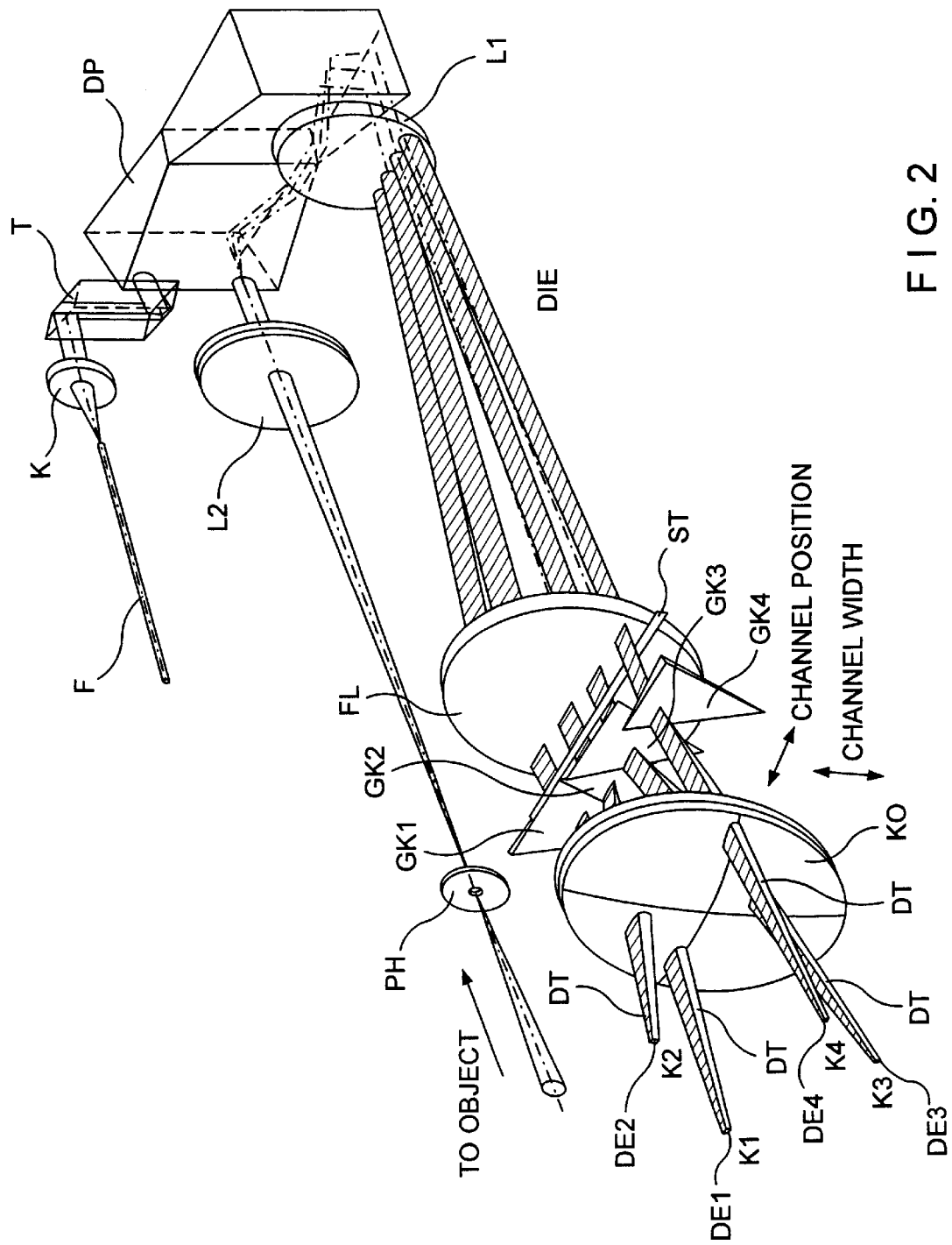
FIG. 2 shows the wavelength selection according to the invention in the detection of fluorescence light or reflected light.

Fluorescent light which has a wavelength displacement relative to the excitation light arrives between the little mirrors S1, S2 . . . . This is described with reference to FIG. 2.

The light returning from the specimen passes through the above described elements and is fanned out spectrally in a dispersion plane DIE by the dispersive element DP and parallelized by the field lens.

The fluorescent light with wavelengths different than those of the excitation light passes next to the little mirrors S1–S3 through the light-transparent carrier ST.

Deflecting elements as wedge-shaped glass prisms GK, in this case GK1, 2, 3, 4, whose quantity is equal to the quantity of evaluating channels, are inserted in the beam path behind the field lens.

The wedge-shaped prisms GK1, 2, 3, 4 are arranged so as to taper downward or upward in the vertical direction relative to the direction of the object light, i.e., are constructed in triangular shape, and GK1, GK4 are arranged in a wedge-shaped manner, i.e., with increasing thickness, substantially in the horizontal direction along the dispersion direction vertical to the optical axis, specifically such that GK1 has a wedge shape extending opposite to that of GK4. However, GK2 and GK3 are constructed so as to be wedge-shaped in the vertical direction with increasing thickness in opposite directions, wherein GK2 has a point at the bottom and an upper rectangular surface at the top and GK3 has an edge at the top.

Viewed from the front, the tapering edge of GK1 (not visible) is arranged on the right-hand side and that of GK4 is arranged on the left-hand side, whereas in the case of GK3 it forms the upper edge.

Figure 2A:
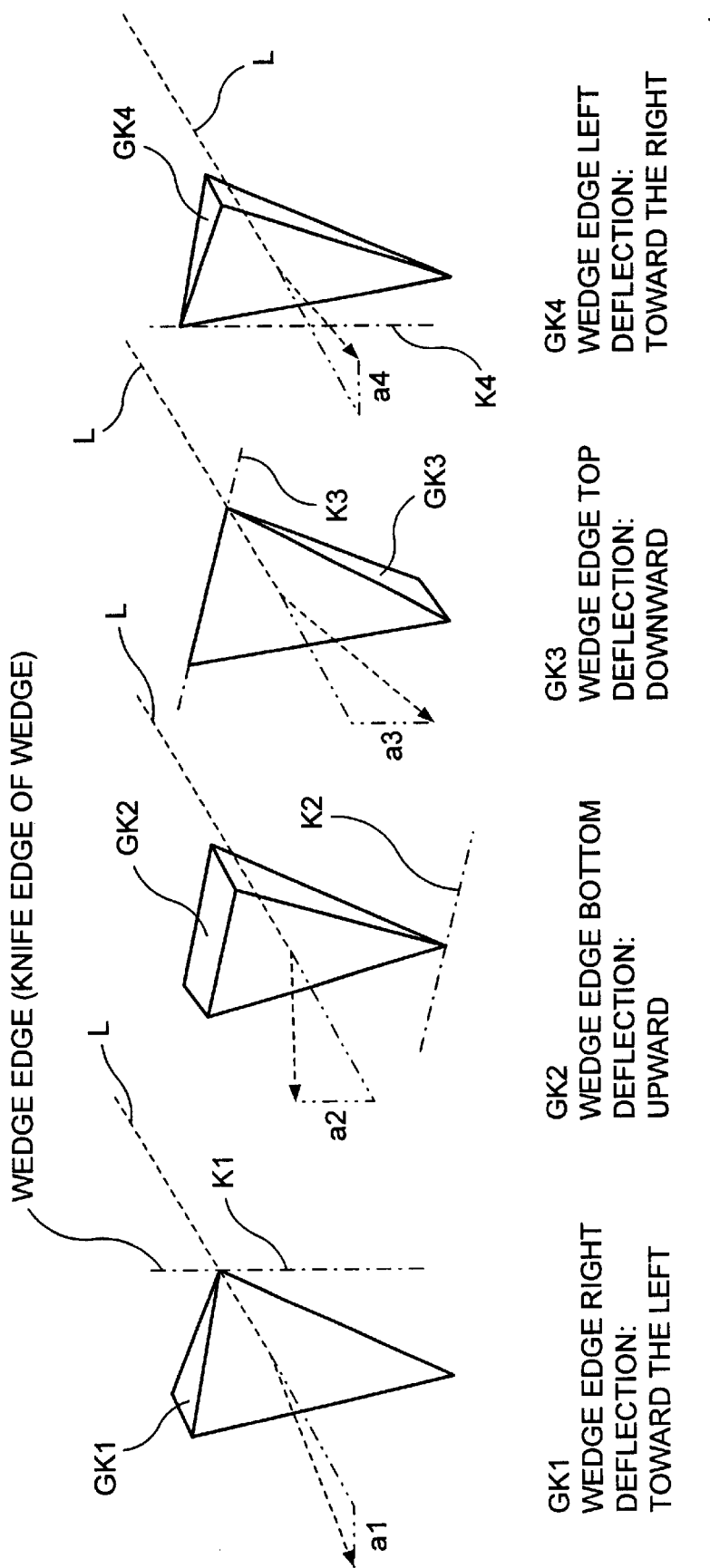
FIG. 2a shows the deflection of the detection light through wedge-shaped elements.

The wedges become increasingly thick proceeding from the edges GK1, 3, 4 or tips (GK2), wherein the light is deflected in the direction in which the thickness of the wedge increases, that is, with reference to the drawing, toward the left in the case of GK1, toward the top in the case of GK2, toward the bottom in the case of GK3 and toward the right in the case of GK4. This is shown more clearly in FIG. 2a. In this view, the knife edge of the wedge, i.e., the start of the wedge increase, is shown as lines K1–4, respectively, wherein it can be seen that GK1, GK4 extend toward the right and left, respectively, with decreasing thickness in the direction of the wedge knife edge K1 and K4, respectively, in horizontally opposite directions, whereas GK2 extends vertically downward in the direction of the wedge knife edge K2 with decreasing thickness in direction K2, whereas in the case of GK3 the upper wedge edge coincides with K3 with thickness decreasing toward the top. The light direction L shown by an arrow undergoes the deflections designated by a1–a4 after passing the wedges GK1–4, a1 toward the left in the drawing, a2 upward, a3 downward, and a4 toward the right.

Orientations of the prismatic wedges other than those shown in the drawings are also possible and conceivable. Due to the different orientation of the wedges, detection paths lying far apart from one another after the collector KO can be realized in an advantageous manner. These elements GK have a deflecting effect due to their wedge shape, and the wedge shape or wedge direction is advantageously selected differently in order to be able to detect channels DT separately. The light of every channel DT is located at a different location behind the collector KO due to the different wedge effect.

The different wedge angle of the prisms GK is responsible for the light deflection and a horizontal displacement of the prisms vertical to the optical axis alters the spectral position of the evaluating channel DT. Further, a vertical displacement of the prisms GK advantageously changes the width of the cut out spectral region.

The light coming from the object is parallelized by the field lens FL in the direction of the wedge prisms GK and the parallel light band that is displaced laterally by the wedge prisms GK is unified by the collector in a punctiform region, so that it can be detected therein by means of a receiver DE1–DE4. Every band is focussed on a different location, so that a plurality of detectors DE can be arranged. If required, emission filters, not yet shown, can be positioned between the collector KO and receiver DE1–4.

The coupling of the device, according to the invention, to a laser scanning microscope is shown by way of example in FIG. 3. The light exiting from the pinhole PH, in this case 28, is imaged to infinity by the collimator 21. The light impinges on the scanner group 22 (shown here schematically as an individual mirror), is imaged in the intermediate image plane 24 of the microscope by the auxiliary objective 23 and, finally, in the specimen through the tube lens 25 and microscope objective 26. The light coming from the specimen takes the opposite optical path in the direction of detection.

While the foregoing description and drawings represent the preferred embodiments of the present invention, it will be obvious to those skilled in the art that various changes and modifications may be made therein without departing from the true spirit and scope of the present invention.

What is claimed is:

1. A device for the adjustable coupling of wavelengths or wavelength regions into the illumination beam path of a confocal microscope, comprising:
   at least one dispersive element for wavelength separation of the illumination light; and
   at least one at least partially reflecting element arranged in the wavelength-separated portion of the illumination light for reflecting back at least one wavelength region in the direction of the microscope illumination.

2. The device according to claim 1, wherein one or more mirrors with a width corresponding to the cut out wavelength region is/are provided.

3. The device according to claim 2, wherein the mirrors are exchangeable.

4. The device according to claim 2, wherein the mirrors are arranged on a carrier.

5. The device according to claim 4, wherein the carrier is constructed so as to be at least partially transparent to light.

6. The device according to claim 4, wherein a plurality of mirrors are provided adjacent to one another in a dispersion plane fixed by the separated wavelength regions.

7. A device for the adjustable detection of object light coming from an illuminated object, in a confrocal microscope beam path, comprising:
   at least one dispersive element for wavelength separation of the object light; and
   means arranged in the wavelength-separated portion of the object light for the adjustable stopping down or cutting out of at least one wavelength region and deflection in the direction of at least one detector.

8. The device according to claim 7, wherein the means comprise at least one prism-shaped wedge made of light-transparent and light-refracting material whose position is adjustable vertical to the light direction in at least one direction.

9. The device according to claim 8, wherein the wedge or wedges has or have a width which can be reduced at least partially vertical to the light direction.

10. The device according to claim 8, wherein a plurality of wedges are arranged in the object light.

11. The device according to claim 8, wherein a plurality of wedges with different wedge angles and/or different alignment with respect to their wedge orientation are arranged in the object light.

12. The device according to claim 8 with optics arranged subsequent to at least one wedge for focusing the cut out wavelength regions on at least one detector.

13. A device for the adjustable detection of object light coming from an illuminated object, comprising:
- at least one dispersive element for wavelength separation of the object light; and
- at least one prism-shaped wedge which is arranged in the wavelength-separated portion of the object light, is made of light-transparent and light-refracting material and whose position is adjustable vertical to the light direction in at least one direction.

14. The device according to claim 13, wherein one or more wedges has or have a width which can be reduced at least partially vertical to the light direction.

15. The device according to claim 13, wherein one or more wedges has or have a decreasing width vertical to the light direction.

16. The device according to claim 13, wherein a plurality of wedges are arranged in the object light.

17. The device according to claim 13, wherein a plurality of wedges with different wedge angles and/or different alignment of their wedge orientation are provided.

18. The device according to claim 13, wherein optics are provided following at least one wedge for focusing the cut out wavelength regions on at least one detector.

19. The device according to claim 16, wherein the wedge or wedges is or are displaceable in a first direction vertical to the dispersion direction (dispersion plane) in order to change the bandwidth of the cut out spectral region by means of its reducible width and/or the wedge or wedges is or are displaceable at least in a second direction in the direction of dispersion in order to change the cut out spectral region and/or wherein the wedge or wedges is or are changeable in their orientation, so that the opening of the wedge angle is oriented electively in different directions vertical to the optical axis.

20. A combination comprising:
- a device comprising at least one dispersive element for wavelength separation of illumination light; and at least one at least partially reflecting element arranged in the wavelength-separated portion of the illumination light for reflecting back at least one wavelength region in the direction of a microscope illumination;
- with at least one of a device comprising:
  - at least one dispersive element for wavelength separation of the object light; and means arranged in the wavelength-separated portion of the object light for the adjustable stopping down or cutting out of at least one wavelength region and deflection in the direction of at least one detector; and a device comprising:
  - at least one dispersive element for wavelength separation of the object light; and at least one prism-shaped wedge which is arranged in the wavelength-separated portion of the object light, is made of light-transparent and light-refracting material and whose position is adjustable vertical to the light direction in at least one direction;
- wherein said combination is in a microscope.

21. The device according to claim 20, wherein at least one dispersive element is used as a common element for coupling in the illumination light and for detecting the object light.

22. The device according to claim 20, wherein different dispersive elements are used for coupling in the illumination light and for detecting the object light.

23. The device according to claim 20, wherein the reflecting element for back reflection during the coupling in of the illumination light is constructed so as to be partially transparent in order to allow the light reflected from the object to pass.

24. A method of using a device as in claim 1 comprising the step of using said device in a confocal microscope.

25. A method of using a device as in claim 7 comprising the step of using said device in a confocal microscope.

26. A method of using a device as in claim 13 comprising the step of using said device in a confocal microscope.

27. A method of using a device as in claim 1 comprising the step of using said device in a laser scanning microscope.

28. A method of using a device as in claim 7 comprising the step of using said device in a laser scanning microscope.

29. A method of using a device as in claim 13 comprising the step of using said device in a laser scanning microscope.

30. A method of using a device as in claim 1 comprising the step of using said device in a confocal fluorescence microscope.

31. A method of using a device as in claim 7 comprising the step of using said device in a confocal fluorescence microscope.

32. A method of using a device as in claim 13 comprising the step of using said device in a confocal fluorescence microscope.

* * * * *